UNITED STATES PATENT OFFICE 2,350,453

METHOD OF PRODUCING SUBSTITUTED GUANIDINE AND BIGUANIDE SALTS

Walter P. Ericks, Stamford, Conn., assignor to American Cyanamid Company, New York, N. Y., a corporation of Maine No Drawing. Application March 4, 1942,
Serial No. 433,298

3 Claims. (Cl. 260—564)

The present invention relates to the production of guanidine and biguanide derivatives and more particularly to a method of producing substituted guanidine and biguanide salts corresponding to the formula

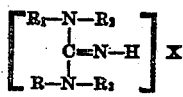

in which R is an aliphatic radical of at least four carbon atoms chosen from the group consisting of alkyl and alkoxyalkyl radicals, $R_1$ is a hydroxyalkyl radical, $R_2$ is a member of the group consisting of hydrogen and a hydroxyalkyl radical, $R_3$ is a member of the group consisting of hydrogen and the radical

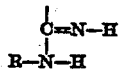

wherein R is as defined above, and X is a salt-forming acid.

I have found that these products may be obtained by reacting a monosubstituted cyanamide of the formula

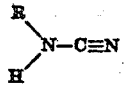

in which R is an aliphatic radical of at least 4 carbon atoms chosen from the group consisting of alkyl and alkoxyalkyl radicals, or its respective dimer with a primary or a secondary alkylol amine salt, the latter being a salt of any suitable acid such as hydrochloric acid, hydrobromic acid, sulphuric acid, phosphoric acid, acetic acid, lactic acid, oxalic acid, citric acid, etc.

There appears to be no upper limit of carbon atoms in the substituent radical R of the monosubstituted cyanamide employed. For example, the R may be either saturated or unsaturated, and a straight chain or a branch chain radical such as isobutyl, n-amyl, sec.-amyl, n-hexyl, 2-ethylhexyl, n-octyl, iso-octyl, nonyl, decyl, dodecyl, tetradecyl, oleyl, cetyl, octadecyl, ceryl, montanyl, melissyl, methoxypropyl, dodecyloxyethyl, oleyloxyethyl, ethyloxypropyl, 2-ethylhexoxypropyl, octadecyloxypropyl, sec.octyloxybutyl or tetradecyloxybutyl.

It is to be further understood that the symbols R, $R_1$, $R_2$ and X when used hereinafter will be defined as above.

The monosubstituted cyanamides utilized in this invention may be prepared by reacting together in an inert solvent, such as benzene or a petroleum ether fraction, the corresponding monoaliphatic amine and a cyanogen halide according to the following equation

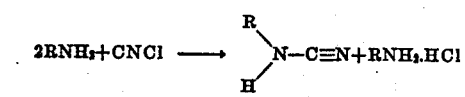

The reaction should be carried out at relatively low temperatures to avoid further reaction between the thus formed cyanamide and amine hydrohalide. These materials are readily separated inasmuch as the amine salt is insoluble in the reaction mixture.

I have found that the monosubstituted cyanamides when heated polymerize readily to the respective dimers as follows

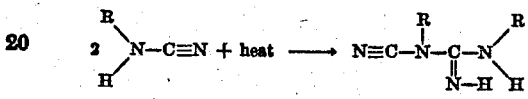

The following equations illustrate more fully the invention wherein a monosubstituted cyanamide is reacted with a primary or a secondary alkylol amine salt to produce the substituted guanidine salt, and a dimer of the monosubstituted cyanamide (e. g., a disubstituted dicyandiamide) is reacted with a primary or a secondary alkylol amine salt to produce the substituted biguanide salt:

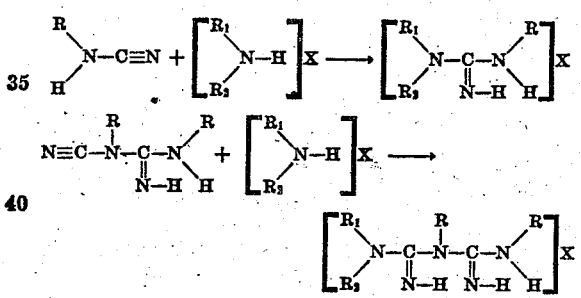

The invention will be illustrated in greater detail by the following examples. The parts are by weight.

EXAMPLE 1

*1-ethylol-3-octadecylguanidine acetate*

40 parts of glacial acetic acid are added slowly with stirring to 30.5 parts of monoethylolamine. The solution is warmed to 65° C., and 147 parts of mono-octadecylcyanamide are added. After stirring and heating the mixture at 125–130° C. for two hours a uniform viscous liquid is obtained which on cooling forms a tan-colored, wax-like product. This product is 1-ethylol-3-octadecylguanidine acetate.

EXAMPLE 2

*1-ethylol-3-(2-ethylhexyl)-guanidine hydrochloride*

A mixture consisting of 30.8 parts of mono-2-ethylhexylcyanamide and 19.6 parts of monoethylolamine hydrochloride is stirred and heated at 125° C. for one hour. Upon cooling, a light-colored soft waxy material is obtained. This material is 1-ethylol-3-(2-ethylhexyl)-guanidine hydrochloride.

EXAMPLE 3

*1-ethylol-3-amylguanidine hydrochloride*

56 parts of monoamylcyanamide are mixed with 48.8 parts of monoethylolamine hydrochloride and the mixture heated slowly with stirring to 130° C. After heating for one half hour the product is cooled to room temperature and obtained as a transparent amber-colored viscous liquid, readily soluble in alcohol and acetone and sparingly soluble in water. This product is 1-ethylol-3-amylguanidine hydrochloride.

EXAMPLE 4

*1,1-diethylol-3-dodecylguanidine acetate*

45 parts of glacial acetic acid are added slowly with stirring to 46 parts of diethylolamine. The solution is heated to 50° C. and 104 parts of monododecylcyanamide are added. The mixture is stirred and heated at 120° C. for two hours. The product, on cooling, is a light amber-colored viscous liquid, readily soluble in water. This product is 1,1-diethylol-3-dodecylguanadine acetate.

EXAMPLE 5

*1-propylol-3-(2-ethylhexyl)guanadine hydrochloride*

A mixture consisting of 44.6 parts of mono-isopropylolamine hydrochloride and 61.6 parts of mono-2-ethylhexylcyanamide is stirred and heated at 130° C. for one half hour. Upon cooling, a soft wax-like product is obtained. This product is 1-propylol-3-(2-ethylhexyl)-guanidine hydrochloride.

EXAMPLE 6

*1-trimethylolmethyl-3-amylguanidine acetate*

70 parts of glacial acetic acid are added slowly to 121 parts of trimethylolmethylamine. After heating the mixture to 60° C., 112 parts of monoamylcyanamide are added. Heating is continued for two hours at a temperature of 120–125° C. The product, on cooling, is a clear viscous amber-colored liquid. This product is 1-trimethylolmethyl-3-amylguanidine acetate.

EXAMPLE 7

*1-ethylol-3,5-dioctadecylbiguanide hydrochloride*

294 parts of mono-octadecylcyanamide are heated at 125° C. for 15 minutes to form the dimer thereof, dioctadecyldicyandiamide. 48.6 parts of monoethylolamine hydrochloride are added, and the mixture stirred and heated at 120° C. for three hours. Upon cooling, a tan-colored, wax-like product is obtained. This product is 1-ethylol-3,5-dioctadecylbiguanide hydrochloride.

EXAMPLE 8

*1,1-diethylol-3,5-di(3-methoxypropyl)-biguanide acetate*

22.8 parts of mono-3-methoxypropylcyanamide are heated at 130° C. for 15 minutes to form the dimer thereof, di-3-methoxypropyldicyandiamide. The product is cooled to 60° C., and a mixture consisting of 9.1 parts of diethylolamine and 12 parts of glacial acetic acid is added. The reaction mixture is heated with stirring to 125° C., and then held at 125–130° C. for two hours. The product, on cooling, is a clear amber-colored viscous liquid. This product is 1,1-diethylol - 3,5 - di(3-methoxypropyl) - biguanide acetate.

The products prepared according to this invention are of particular utility as emulsifying agents, detergents in acid solution, wetting agents, demulsifiers for breaking oil emulsions, in the formulation of printing inks, dye baths, dye pastes, for depositing rubber latex emulsions on cloth, as flotation agents, as photographic assistants, as plasticizers, as insecticides, as emulsifiers of resins and waxes and as softeners for leather.

While the invention has been described with particular reference to specific embodiments, it is to be understood that it is not to be limited thereto but is to be construed broadly and restricted solely by the scope of the appended claims.

I claim:
1. The method of producing substituted biguanide salts corresponding to the formula

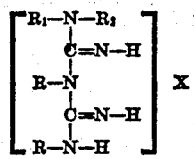

in which R is an aliphatic radical of at least four carbon atoms chosen from the group consisting of alkyl and alkoxyalkyl radicals, $R_1$ is a hydroxy-alkyl radical, $R_2$ is a member of the group consisting of hydrogen and a hydroxyalkyl radical, and X is a salt-forming acid which comprises heating the dimer of a monosubstituted cyanamide of the formula

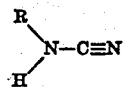

with an alkylol amine salt of the formula

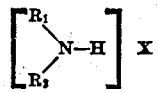

in which R, $R_1$, $R_2$, and X are as defined above.

2. The method of producing substituted biguanide salts corresponding to the formula

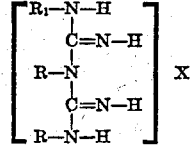

in which R is an aliphatic radical of at least four carbon atoms chosen from the group consisting of alkyl and alkoxyalkyl radicals, $R_1$ is a hydroxyalkyl radical, and X is a salt-forming acid which comprises heating the dimer of a monosubstituted cyanamide of the formula

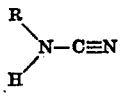

wherein R is as defined above together with a primary alkylol amine salt.

3. The method of producing substituted biguanide salts corresponding to the formula

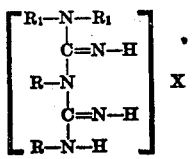

in which R is an aliphatic radical of at least four carbon atoms chosen from the group consisting of alkyl and alkoxyalkyl radicals, $R_1$ is a hydroxyalkyl radical, and X is a salt-forming acid which comprises heating the dimer of a monosubstituted cyanamide of the formula

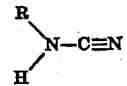

wherein R is as defined above together with a secondary alkylol amine salt.

WALTER P. ERICKS.